United States Patent Office 3,290,407
Patented Dec. 6, 1966

3,290,407
PROCESS AND CATALYST FOR DEHYDROGENA-
TION OF HYDROCARBONS
Emory W. Pitzer, Bartlesville, Okla., assignor to Phillips
Petroleum Company, a corporation of Delaware
No Drawing. Filed Sept. 23, 1964, Ser. No. 398,774
9 Claims. (Cl. 260—683.3)

This invention relates to the catalytic dehydrogenation of hydrocarbons to produce less saturated hydrocarbons. More specifically it relates to the catalytic dehydrogenation of saturated acyclic and cyclic as well as unsaturated acyclic and cyclic hydrocarbons to less saturated hydrocarbons. In one of its more specific aspects it relates to an improved process for the dehydrogenation of aliphatic hydrocarbons having 2 to 12 carbon atoms therein to produce the corresponding olefins and diolefins and is particularly applicable to the production of olefins and diolefins from paraffins containing from 4 to 5 carbon atoms per molecule. Another aspect of the present invention is the provision of novel improved catalysts for the catalytic dehydrogenation of hydrocarbons.

The use of a diluent in dehydrogenation is desirable because the partial pressure of the material being dehydrogenated is reduced, thus favoring a higher conversion, and the diluent can also be used to supply heat for the highly endothermic dehydrogenation reaction. From the standpoint of chemical and physical characteristics, the most desirable diluent for dehydrogenation is water vapor. This diluent can be cheaply provided in any desired amount and can be removed from the hydrocarbon stream by simple condensation, thereby eliminating a large part of the compression and fractionation equipment necessary when other diluents are used. Steam has been used as a feed diluent in several different types of catalytic and thermal processes for hydrocarbon conversion such as cracking and olefin dehydrogenation. In such processes, particularly those in which solid catalysts are used, the steam serves not only as a diluent but also as a reagent for the removal of carbon that deposits on the catalyst. However, prior to the present invention a completely satisfactory catalyst for use in oxidative dehydrogenation in the presence of steam was not known. Aluminum-containing catalysts heretofore known in the art suffered from the problems of water-sensitivity, which results in a relatively rapid loss of catalyst activity, and the addition of silica as a stabilizer imparts cracking activity to the catalyst, resulting in a decrease in selectivity of conversion to the desired olefins and/or diolefins. Also, catalysts which are sufficiently resistant to poisoning of this kind to make practicable steam-diluted dehydrogenation processes have shown a tendency to decline rapidly in activity when used at elevated temperatures over prolonged periods. Although this decline in activity may not justify discarding or frequently regenerating the catalyst, the overall result is a reduction in selectivity and yield of desired products.

I have now discovered that these problems previously experienced with catalyst systems and processes for the dehydrogenation of steam-diluted hydrocarbons are overcome by the use of a halogen-alumina catalyst system as hereinafter described.

An object of this invention is to provide a process for the dehydrogenation of hydrocarbons wherein steam or water vapor may be effectively and efficiently employed as the diluent. Another object of this invention is to provide an improved process for the dehydrogenation of aliphatic hydrocarbons. A more specific object is to provide a process and catalyst system which is particularly applicable to the dehydrogenation of butane to produce butenes and butadiene. A still further object is to provide a process for the dehydrogenation of butenes to butadiene. Still another object of the present invention is to provide a catalyst and process which obtain selective conversion of paraffins to olefins and diolefins in the presence of water vapor as a diluent. Other objects and advantages will become apparent to those skilled in the art from the following detailed disclosure and the appended claims.

According to this invention hydrocarbons are advantageously dehydrogenated in the presence of oxygen, halogen and steam as a diluent to produce olefins and diolefins when a catalyst system consisting of hydrogen halide-treated, halogen-treated or aluminum halide-treated $\alpha$-alumina is employed.

The catalyst for the process of my invention is alpha-alumina that has been treated with a halogen, an aluminum halide, or a hydrogen halide, preferably hydrogen fluoride, to form a material having a halogen content of 0.1 to 10 percent, preferably 0.5 to 5 percent. The treating agent can be used in vapor or liquid phase or can optionally be dissolved in water or a suitable organic solvent. Treating times of 1 minute to several hours can be used, and treating temperatures from 50° to 1000° F. can be used, followed by drying and optional additional heating at 100° to 1500° F. For example, gaseous HCl, liquid chlorine, or an aqueous solution of hydrogen fluoride, aluminum fluoride, or aluminum chloride is used to impregnate a porous $\alpha$-alumina carrier, suitably in the form of small pellets, followed by heating at a moderately elevated temperature. The catalyst can be used in the form of granules of approximately 5 to 60 mesh size, in the form of pills or pellets, in the form of fluidized powder or in the form of dust suspended in the feed.

In the operation of the present invention the hydrocarbon feed, e.g. normal butane, is admixed with steam, the mixture is heated to the conversion temperature, and is passed into contact with the catalyst, oxygen and halogen—e.g., iodine. The effluent from the dehydrogenation zone may be processed in known manner for the separation of substantially pure olefins and diolefins— e.g., butenes and butadiene. The olefins may be separately dehydrogenated in a known manner for conversion to diolefins. Unconverted paraffins are recycled to the dehydrogenation step. If desired, the diolefins may be separated from the effluent and the olefins together with unreacted paraffins recycled to the dehydrogenation step.

Preferred conditions for dehydrogenation of steam diluted hydrocarbons in accordance with this invention are: temperature, 700–1800° F., preferably 850–1150° F.; absolute pressure, 0.5–5 atmospheres, preferably 1–3 atmospheres; volume ratio of steam to hydrocarbon, 1 to 50 mols of steam per mol of hydrocarbon, preferably 2 to 30 mols of steam per volume of hydrocarbon; hydrocarbon space velocity 1–1000, preferably 4–200, gaseous volumes (S.T.P.) per volume of catalyst per hour. The hydrocarbon and the steam are preferably mixed before charging to the reaction zone, or the steam can be separately injected at a plurality of points along the reaction zone. The steam is preferably preheated to a temperature at least at least as high as the temperature employed in the reaction and in some cases it may be preferable to separately preheat the hydrocarbons and the steam before mixing. It is sometimes desirable to preheat the steam to a temperature somewhat above the desired conversion temperature and to admix the preheated steam with preheated paraffin at a temperature slightly below the desired reaction temperature such that the resulting mixture attains the reaction temperature. The effluent from the reaction zone is cooled to condense and remove steam and halogen, and the individual hydrocarbon components are separated by conventional methods such as fractionation, solvent extraction, and so forth. When the activity of the catalyst becomes undesirably low because of carbon deposition, the flow of hydrocarbons and halogen is interrupted, and steam or steam-air is allowed to contact the catalyst until the carbon is removed.

The dhydrogenation of hydrocarbons by the inventive process is generally carried out by passing the gaseous mixture with oxygen and a halogen over the halogen-alumina catalyst. Instead of pure oxygen, preference is generally given to a gas containing molecular oxygen such as air. The amount of oxygen to be used generally depends on the kind of hydrocarbon to be dehydrogenated as well as on the preferred product. In other words, the theoretical amount of oxygen should be almost stoichiometric according to the number of hydrogen atoms to be eliminated from the hydrocarbon and to be oxidized in the form of water. For example, 1 mol of oxygen is necessary to convert 1 mol of butane into butadiene, that is, twice the amount necessary for the conversion of butene. In practice, the amount of oxygen is between 0.25 and 2.5 times and preferably between 0.5 and 1.5 times the theoretical amount.

The halogen preferably consists of bromine or iodine. It is used as the elementary halogen, or can be used wholly or partly in the form of an appropriate halogen-containing compound, able to give elementary halogen under the reaction conditions. The halogen can thus be formed, for example, from the corresponding hydrogen halide, for example hydrogen iodide, or a hal-hydrocarbon. In this latter case, a hydrogen derivative of the hydrocarbon to be dehydrogenated such as butyl iodide is advantageously chosen to dehydrogenate butane. When a part of the reaction products is recycled in the operation, they generally contain derivative halogenated products, for example hydrogen iodide alkyl iodides, etc.

The amount of halogen added can vary within broad limits. But it is desirable, for reasons of economy, to add as small an amount of halogen as possible. An important advantage of the invention lies in the possibility of carrying out the operation of dehydrogenation in the presence of a very small amount of halogen, substantially less than the stoichiometric amount. Thus it is likely that the halogen can be considered simply as a catalyst and that in some cases a trace is sufficient to catalyze the reaction. Then the halogen can be regenerated to be used again.

The process of my invention can be successfully applied to dehydrogenate various aliphatic cycloaliphatic hydrocarbons as well as the alkyl substituents of alkylated aromatic compounds. For example, compounds which can be suitably dehydrogenated are alkanes, especially the lower alkanes having from about 2 to 12 carbon atoms per molecule, to form the corresponding olefins and diolefins. Alkanes can be used as a starting material; or, as is often the case, the alkane is used and the resultant product is a mixture of olefins and diolefins. The preferred reaction of my invention is the dehydrogenation of paraffins having from four to five carbon atoms, especially the dehydrogenation of butane to butenes and butadiene. Examples of compounds suitable for use in this invention include ethane, propane, butane, isobutane, n-pentane, isopentane, n-hexane, 2-methylpentane, 3-methylpentane, 2,2-dimethylbutane, 2,3-dimethylbutane, n-heptane, isooctane, n-nonane, n-dodecane, 4-methylundecane, cyclobutane, cyclopentane, cyclohexane, 1,3-dimethylcyclohexane, 1,4-di-n-propylcyclohexane, ethylbenzene, n-butylbenzene, 1,3,5-triethylbenzene, butene-1, butene-2, 2-methylpentene-2, 2-methylpentene-3, heptene-1, cyclohexene, dodecene-3, and the like, and mixtures thereof. Examples of other possible reactions are the dehydrogenation of cyclohexane to cyclohexene, and ultimately to benzene; ethylbenzene to styrene, and the like. Multiple dehydrogenation can and frequently does occur, as in the formation of benzene from cyclohexene and diolefins from paraffins. In addition mixtures of saturated and unsaturated materials can be used to produce the corresponding more highly unsaturated materials.

The following examples are presented to further illustrate the invention:

*Example I*

Normal butane diluted with 2.9 mols of steam, 4.8 mols of air and 0.04 mol of iodine per mol of butene was dehydrogenated at atmospheric pressure at a butane space velocity of 60 v./v./hr. and a temperature of 1000° F. with an HF-treated α-alumina. A second run was carried out under similar conditions using untreated α-alumina. The following results were obtained:

| Catalyst | $C_4H_{10}$ SV, v./v./hr.[1] | Temp., ° F. | Mol Percent | | | | Total Selectivity [2] | Ratio, $C_4H_6/C_4H_8$ |
| --- | --- | --- | --- | --- | --- | --- | --- | --- |
| | | | Per Pass Yield | | | | | |
| | | | Conv. | $C_4H_8$ | $C_4H_6$ | Total | | |
| HF-trtd α-$Al_2O_3$ (1) | 60 | 1,000 | 26.5 | 3.0 | 17.8 | 20.8 | 78.6 | 5.0 |
| α-$Al_2O_3$ (2) | 60 | 1,000 | 22.6 | 3.8 | 11.4 | 15.2 | 67.4 | 3.0 |

[1] Butane space velocity.
[2] Mols of butene plus butadiene per 100 mols butane converted.

The amount of halogen generally necessary is less than 0.1 mol per mol of the hydrocarbon charge. This amount is advantageously between 0.001 and 0.09 mol and preferably between 0.01 and 0.06 mol per mol of hydrocarbon. Excellent results have been obtained within the limits mentioned above by introducing one or two new C—C double bonds into the molecule, as in the conversion of butanes and butenes into butadiene. But if a greater number of double bonds is formed, as for example in the preparation of benzene from n-hexane, the relative amount of halogen must be higher.

The operation can be carried out by passing the gas mixtue over a fixed catalyst bed or into a reactor which contains the catalyst in the fluidized state, by passing the gas mixture containing catalyst dust through a heated zone, or by other means known in the art.

Comparison of the data for HF-treated alpha-alumina with those for alpha-alumina indicates that the conversion, yield, selectivity, and butadiene to butene ratio are all increased.

The catalyst used in the dehydrogenation runs reported above were:

(1) HF-treated alpha-alumina containing 2 weight percent fluorine. This catalyst was prepared by impregnating the alpha-alumina pellets with sufficient aqueous HF of the proper concentration to give the desired fluorine content and drying the impregnated pellets under a heat lamp.

(2) Alpha-alumina in the form of ⅛-inch pellets obtained from The Norton Company.

*Example II*

Butene-2 diluted with 2.9 mols of steam, 4.8 mols of air and 0.04 mol of iodine per mol of butene-2 was dehydrogenated at atmospheric pressure with a catalyst prepared by blending alpha-alumina and aluminum fluoride.

The following results were obtained:

| Catalyst | $C_4H_8$-2 SV, v./v./hr. | Temp., °F. | Mol Percent ||| 
|---|---|---|---|---|---|
| | | | Conv. | Per Pass Yield of $C_4H_6$ | Selectivity |
| Empty Reactor | 30 | 930 | 5.0 | 4.7 | 94.0 |
| $AlF_3$-α-$Al_2O_3$ | 30 | 930 | 59.9 | 56.9 | 94.9 |
| $AlF_3$-α-$Al_2O_3$ | 200 | 930 | 9.2 | 8.3 | 91.1 |

The $AlF_3$-α-$Al_2O_3$ catalyst was prepared by immersing 100 cc. of α-$Al_2O_3$ pellets in an aqueous solution containing 9 grams of $AlF_3$ in 100 cc. of water for 8 minutes at about 200° F., draining and drying. The finished catalyst contained 0.55 weight percent fluorine, corresponding to 0.81 weight percent $AlF_3$.

*Example III*

Normal butane diluted with 2.9 mols of steam, 4.8 mols of air and 0.04 mol of iodine per mole of butane was dehydrogenated at atmospheric pressure with a catalyst prepared by adding $AlCl_3$ to alpha-alumina.

The following results were obtained:

| Catalyst | $C_4H_{10}$SV, v./v./hr. | Temp., °F. | Mol Percent |||| Ratio, $C_4H_6/C_4H_8$ |
|---|---|---|---|---|---|---|---|
| | | | Per Pass Yield |||| Total Selectivity | |
| | | | Conv. | $C_4H_8$ | $C_4H_6$ | Total | | |
| Empty Reactor | 3.75 | 930 | 10.2 | 3.3 | 4.0 | 7.3 | 72.0 | 1.2 |
| $AlCl_3$-α-$Al_2O_3$ | 3.75 | 930 | 41.0 | 1.9 | 31.7 | 33.6 | 82.1 | 16.7 |

The $AlCl_3$-α-$Al_2O_3$ catalyst was prepared by immersing 100 grams of α-$Al_2O_3$ pellets in an aqueous solution containing 25.5 weight percent $AlCl_3 \cdot 6H_2O$ for 10 minutes, drained, and dried overnight at room temperature. The finished catalyst contained 1.38 weight percent chlorine, corresponding to 1.73 percent $AlCl_3$.

The above examples clearly indicate that the use of a halogen containing catalyst serves to improve yield, conversion, selectively and butadiene to butene ratio.

Reasonable variations and modifications of this invention can be made, or followed, in view of the foregoing, version, selectivity and butadiene to butene ratio.

I claim:
1. A process for the dehydrogenation of a dehydrogenatable hydrocarbon which comprises contacting said dehydrogenatable hydrocarbon with halogen-containing alpha-alumina catalyst having a halogen content of 0.1 to 10 percent at a temperature in the range of 700 to 1800° F. in the presence of oxygen and a halogen present in an amount of from 0.001 to 0.09 mol per mol of dehydrogenatable hydrocarbon.

2. The process of claim 1 wherein said hydrocarbon is diluted with water vapor.

3. A process according to claim 1 wherein said halogen-alumina catalyst is an HF-treated alpha-alumina catalyst.

4. A process according to claim 1 wherein said halogen-alumina catalyst is an aluminum chloride-alpha-alumina composite.

5. A process according to claim 1 wherein said halogen-alumina catalyst is an aluminum fluoride-alpha alumina.

6. A process for the dehydrogenation of an aliphatic hydrocarbon which comprises contacting said hydrocarbon diluted with from 1 to 50 mols of water vapor per mol of hydrocarbon with 1.25 to 12.5 mols of oxygen and 0.001 to 0.09 mol of a halogen at a temperature within the range of from about 700° F. to about 1800° F. with a catalyst consisting essentially of halide containing alpha-alumina having a halogen content of 0.1 to 10 percent.

7. A process for the catalytic dehydrogenation of an aliphatic hydrocarbon containing from 4 to 5 carbon atoms per molecule which comprises contacting said hydrocarbon diluted with 2–30 mols of water vapor, 2.5–7.5 mols of air, 0.01–0.06 mol of iodine per mol of hydrocarbon at a temperature within the range of from about 850° F. to about 1150° F. with a catalyst consisting essentially of HF-treated alpha-alumina.

8. A process according to claim 7 wherein said hydrocarbon is butane.

9. A process according to claim 7 wherein said hydrocarbon is butenes.

References Cited by the Examiner

UNITED STATES PATENTS

| 2,397,638 | 4/1946 | Bell et al. | 260—683 |
| 2,921,101 | 1/1960 | Magovern | 260—680 |
| 3,207,806 | 9/1965 | Bajars | 260—680 |
| 3,207,808 | 9/1965 | Bajars | 260—680 |

DELBERT E. GANTZ, *Primary Examiner.*

G. E. SCHMITKONS, *Assistant Examiner.*